United States Patent [19]

Sheppard

[11] Patent Number: 4,884,544
[45] Date of Patent: Dec. 5, 1989

[54] CONTROL CABLE

[75] Inventor: William L. Sheppard, Romulus, Mich.

[73] Assignee: Cable Manufacturing and Assembly Company, Inc., Fairfield, N.J.

[21] Appl. No.: 180,385

[22] Filed: Apr. 12, 1988

[51] Int. Cl.⁴ ............................................. F02D 7/00
[52] U.S. Cl. .................................... 123/400; 74/500
[58] Field of Search ............... 123/400, 403, 198 D, 123/630; 251/54, 78, 129.03, 285; 74/513, 514, 526, 500

[56] References Cited

U.S. PATENT DOCUMENTS

| | | | |
|---|---|---|---|
| Re. 18,331 | 6/1932 | Thorp et al. | 74/513 |
| Re. 19,262 | 8/1934 | Brandt, Jr. | 74/513 |
| 368,016 | 8/1887 | Schrankel | 74/110 |
| 1,281,854 | 10/1918 | Schwartz | 74/513 |
| 1,350,986 | 8/1920 | Caudron | 74/110 |
| 1,471,831 | 10/1923 | Corset | 123/400 |
| 1,626,722 | 5/1927 | Cole | 74/513 |
| 1,939,766 | 12/1933 | Corset | 74/39 |
| 2,358,597 | 9/1944 | Russell | 74/513 |
| 2,384,742 | 9/1945 | Hewitt | 74/110 |
| 2,825,418 | 3/1958 | Kershuran | 74/513 |
| 2,866,446 | 12/1958 | Feuerstein et al. | 123/400 |
| 2,869,377 | 1/1959 | Pieterse | 74/216.3 |
| 3,103,126 | 9/1963 | Textrom | 74/246 |
| 3,177,683 | 4/1965 | Olson | 64/2 |
| 3,204,480 | 9/1965 | Bradbury | 74/425 |
| 3,287,992 | 11/1966 | Smith | 74/513 |
| 3,298,243 | 1/1967 | Geissler et al. | 74/501 |
| 3,304,878 | 2/1967 | Sabre | 103/93 |
| 3,538,786 | 11/1970 | Coordes et al. | 74/501 |
| 3,543,601 | 12/1970 | Barger | 123/400 |
| 3,631,731 | 1/1972 | Hawtree | 74/501 R |
| 3,667,313 | 6/1972 | Young, Jr. | 74/501 P |
| 3,757,514 | 9/1973 | Reist | 59/78 |
| 3,771,384 | 11/1973 | Hackman | 74/505 |
| 3,841,171 | 10/1974 | Young, Jr. | 74/501 R |
| 3,927,899 | 12/1975 | Bough | 280/87 A |
| 3,945,268 | 3/1976 | Ion et al. | 74/501 R |
| 3,965,802 | 6/1976 | Jacobs | 92/84 |
| 3,990,321 | 11/1976 | Hurlow | 74/501 R |
| 3,998,109 | 12/1976 | O'Brien | 74/475 |
| 4,062,251 | 12/1977 | Parsons | 74/501 R |
| 4,117,809 | 10/1978 | Kittler | 123/403 |
| 4,238,973 | 12/1980 | Polo et al. | 74/501 R |
| 4,297,913 | 11/1981 | Garbo | 74/501 R |
| 4,473,077 | 9/1984 | Noiles et al. | 128/305 |
| 4,524,741 | 6/1985 | Corbi | 123/400 |
| 4,530,326 | 7/1985 | Mann et al. | 123/400 |
| 4,542,661 | 9/1985 | Teramachi | 74/424.8 NA |
| 4,546,667 | 10/1985 | Bobpst, III | 74/513 |
| 4,707,017 | 11/1987 | Minobe et al. | 296/78.1 |
| 4,721,281 | 1/1988 | Kratt et al. | 123/400 |

FOREIGN PATENT DOCUMENTS 792985  4/1958  United Kingdom ............... 74/513

Primary Examiner—Raymond A. Nelli
Attorney, Agent, or Firm—Harness, Dickey & Pierce

[57] ABSTRACT

A control cable which transmits a one-way compressive force in a first direction to actuate a fuel control and which exerts zero force in the return direction.

42 Claims, 3 Drawing Sheets

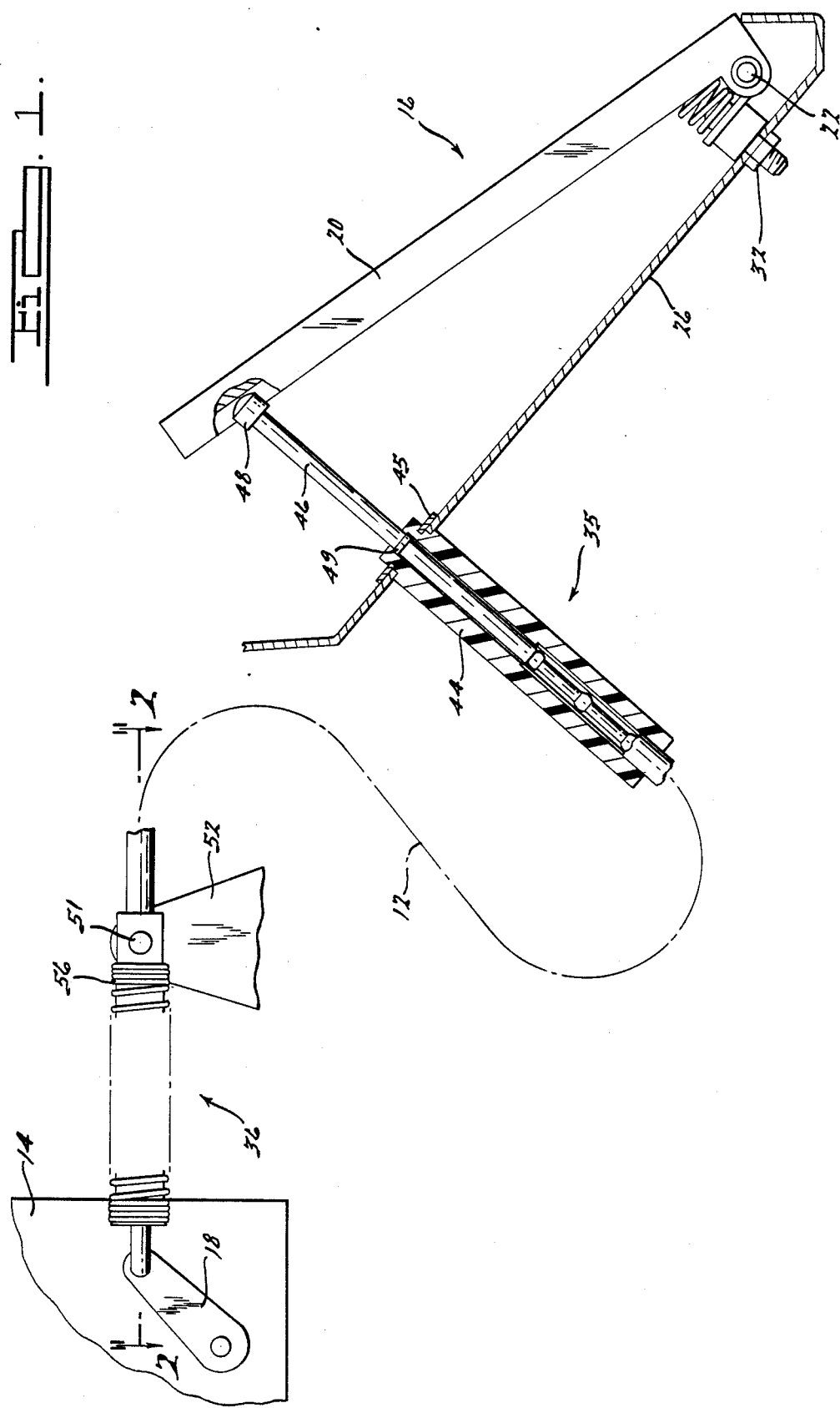

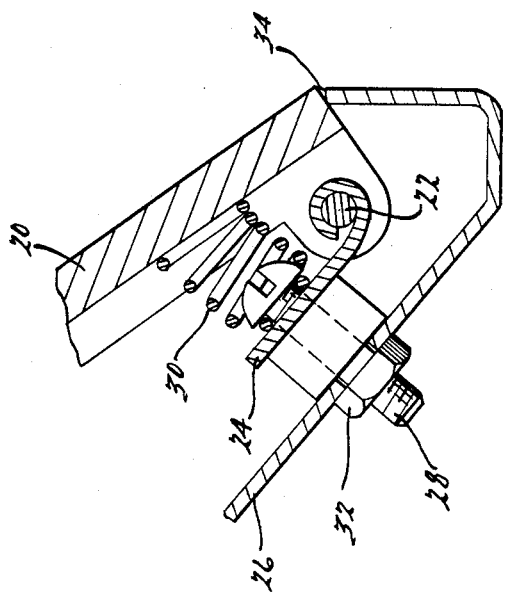
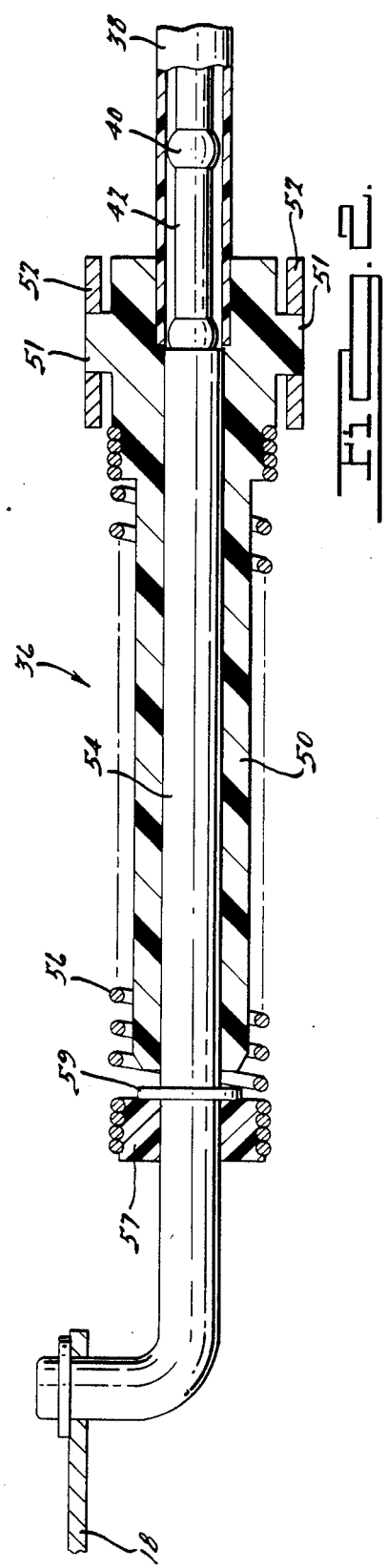

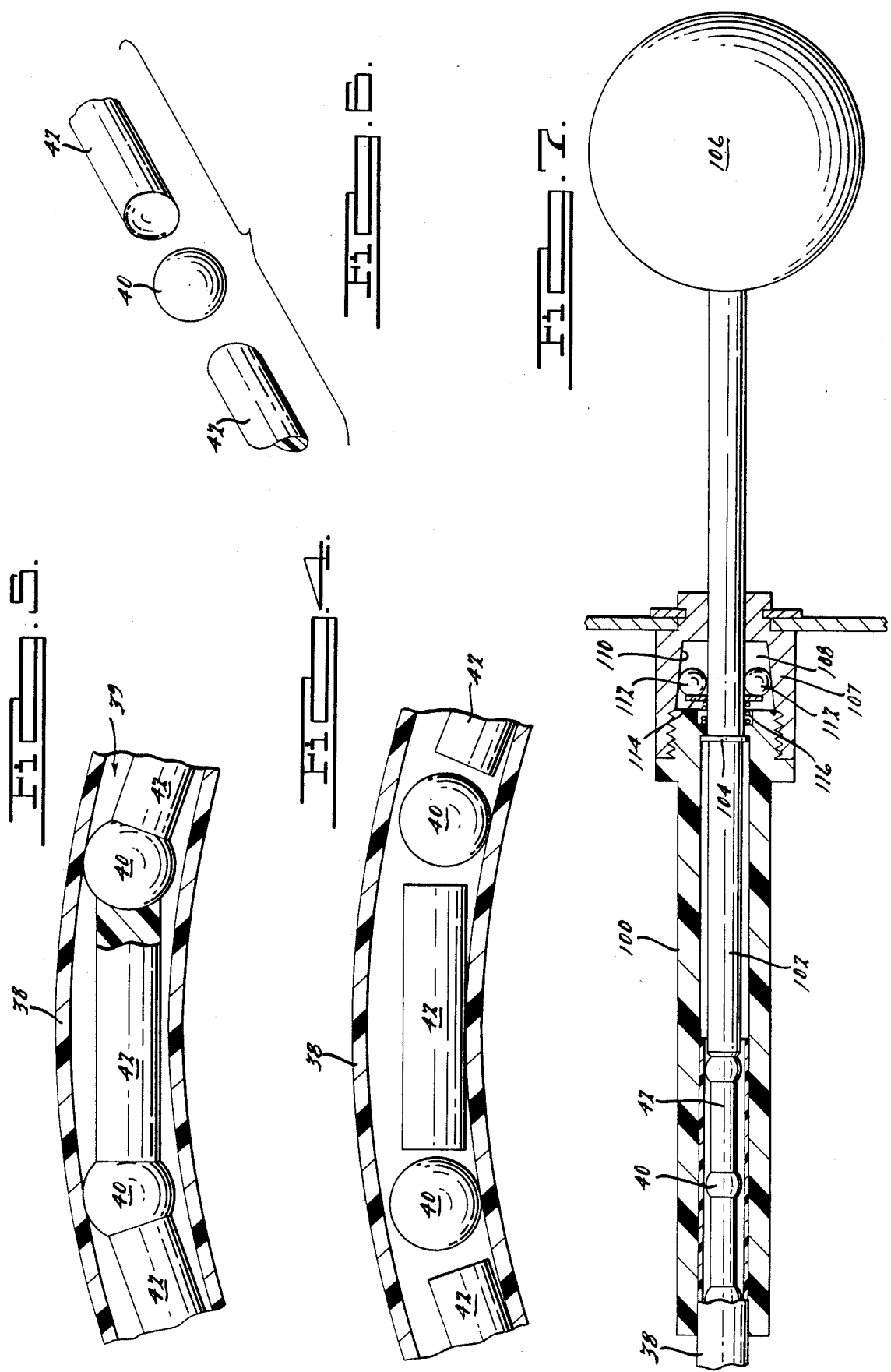

1

CONTROL CABLE

BACKGROUND AND SUMMARY OF THE INVENTION

The present invention relates to control cables and, more particularly, to a novel cable-like device which transmits one-way compression forces in a first direction and zero force in the reverse direction.

A number of different types of control cables have been used through the years. In the engine throttle control area, for example, cables having an outer tube and an inner braided metallic cord are common for linkage between an accelerator pedal and a carburetor, fuel injector body or the like. Such cables, which are generally tension or pull only type devices, tend to be high friction devices in the throttle closing direction.

Throttle sticking is a problem sometimes encountered with this type of cable. Generally, such sticking occurs at low speeds because friction loads on the throttle bearings are at maximum under this condition, often aggravated by the fact that the throttle return spring has less effect at the extremes of throttle displacement due to the shorter effective moment arm of the usual pivoting lever actuator in these positions. This friction in combination with that of the cable, in the presence of possible reduced spring return forces, can cause the vehicle minimum speed to exceed 25 m.p.h. One way to overcome such sticking is to increase the spring force of the throttle return spring, however, this can cause the phenomenon referred to as "cyclic driving".

Cyclic driving occurs when a strong throttle return spring exerts an excessive force on the throttle cable which, in turn, exerts an excessive force on the accelerator pedal. As an operator is driving a vehicle, this high pedal return force, caused by the strong throttle return spring, pushes against the operator's foot and progressively causes it to raise, thereby causing the vehicle to progressively slow down. When the operator eventually realizes that he has slowed down, he pushes the accelerator pedal back down to increase the vehicle speed back to normal. The cycle then repeats. This repeated slowing and speeding up process is known as cyclic driving.

Another more serious problem, which applicant believes is associated with throttle linkage or cable sticking, is "vehicle run-away". Applicant believes this occurs in accordance with the following scenario. The vehicle engine is operating at a curb idle when the automatic transmission is placed in gear. The transmission drag reduces the engine idle speed which causes the idle control to crack open the throttle to restore the engine to a normal idling speed. This cracking open of the throttle increases air flow in the engine causing a leaner mixture of the fuel/air ratio. The fuel injection system of the vehicle, in an attempt to restore the proper fuel-/air ratio, increases the fuel supply causing the engine to flood and begin to stall. The driver, in an attempt to overcome the flooding, vigorously steps on the accelerator pedal to open the throttle further to prevent the engine from stalling. As the engine flooding condition clears, the vehicle takes off at near full throttle. The driver removes his foot from the accelerator pedal, but the throttle linkage or cable sticks or responds slowly and a vehicle run-away condition exists.

A primary object of the present invention resides in the provision of an improved cable, and particularly an improved throttle cable, that has negligible friction in the return direction thereby enabling the cable to rapidly and reliably return to its original position, thus substantially eliminating the aforesaid problems associated with throttle sticking. Also, the present invention enables the use of a throttle return spring with a reduced spring force, thereby minimizing the chance of cyclic driving.

From the subsequent description and appended claims taken in conjunction with the accompanying drawings, additional features and advantages of the present invention will become apparent to those skilled in the art.

BRIEF DESCRIPTION OF THE DRAWINGS

FIG. 1 is a side elevational schematic view partially in cross-section of an engine throttle control in accordance with the present invention, shown in a fully returned or engine-idle position.

FIG. 2 is a cross-sectional view taken generally along line 2—2 in FIG. 1.

FIG. 3 is an enlarged vertical cross-sectional view of the rightmost portions of the mechanism shown in FIG. 1.

FIG. 4 is a longitudinal cross-sectional view of a cable in accordance with the present invention shown in a stressed, compression or pushing state.

FIG. 5 is a view similar to FIG. 4 of the same cable in a non-stressed floating state.

FIG. 6 is a perspective view of elements of the cable in accordance with the present invention.

FIG. 7 is a longitudinal cross-sectional view of a manual hand control in accordance with the present invention.

SUMMARY OF THE INVENTION

Referring to the drawings, particularly to FIG. 1, the invention is disclosed embodied in a throttle control comprising a cable 12 coupled between a fuel control mechanism 14 and an activation member 16.

The throttle mechanism 14 can be a carburetor, injector throttle body or the like, and has a pivoting lever 18 associated with it so that it can be activated from a closed or low engine-idle position as shown to an open, or high engine-speed position. Activation member 16 includes an accelerator pedal 20 pivotally connected by a pivot pin 22 to a mounting bracket 24 affixed to a floorboard or the like 26 by means of a bolt 28, and means for biasing pedal 20 to its normal non-depressed condition comprising a resilient helical coil compression spring 30 having one end engaging the bottom of the pedal and the opposite thereof clamped between bracket 24 and the head of bolt 28. A nut 32 is threadably attached to bolt 28 to hold the assembly together. As force is exerted on pedal 20 in a depressing or accelerating direction, spring 30 compresses. As the force is removed from pedal 20, spring 30 pushes against pedal 20 back to its original position in which is abuts a stop 34, as seen in FIGS. 1 and 3.

Cable 12 generally includes two end members 35 and 36, an outer tube 38 and a unique inner cable-like structure 39 comprised of a plurality of loosely disposed alternating separate spherical rollers 40 and cylindrical spacers 42. An unusual feature of the present invention is that there is no continuous tension member interconnecting the rollers and spacers.

End member 35 includes a rigid tubular housing 44 affixed to floorboard 26 by a snap ring 45, and a push rod 46 slidably disposed in housing 44 and engaging the end of inner cable 39. Push rod 46 has a head 48 at its outer end adapted to engage pedal 20 when the latter is depressed, and an intermediate shoulder 49 to limit the travel of push rod 46 out of housing 44. When pedal 20 is in its non-depressed or engine idle position there is a small clearance between head 48 and the pedal so the cable can float in tube 38.

End member 36 includes a housing 50 pivotally secured by trunions 51 to the arms 52 of a suitable mounting bracket. A push rod 54 is slidably disposed in housing 50 and at one end is coupled with the lever 18 in the manner shown, the other end engages the other end of cable 39. Push rod 54 moves the lever 18 which, in turn, controls the throttle and hence engine speed/torque. A throttle return spring in the form of a helical coil tension spring 56 is secured at one end to housing 50, and at the other end to an annular member 57 positioned on push rod 54 by an annular member 59.

When a compressive force is exerted on inner cable 39 spring 56 is tensioned as push rod 54 is moved in housing 50 to pivot lever 18 to open the throttle and increase air flow to the engine (not shown). As the compressive force on inner cable 39 is removed, spring 56 relaxes to return push rod 54, via annular member 59, to its original position. Spring 56 preferably has a return force that is approximately 10% greater than the return force normally necessary to overcome friction and return lever 18 back to its normal engine-idle position. This 10% greater return force is substantially less than the approximately 40–100% greater return force which is often necessary in conventional throttle return springs. The 10% greater return force thus provides less return force on the activation member 16 thereby tending to reduce cyclic driving. Spring 30 exerts a minimum force just sufficient to return pedal 20, preferably faster than spring 56 returns the elements of cable 39.

Cable tube 38, rollers 40 and spacers 42 are preferably manufactured from non-corrosive materials. Tube 38 is preferably formed of nylon which is capable of being bent into the desired configuration. Rollers 40 may be manufactured from a low friction polymeric material such as Teflon or Delrin, and have an outside diameter such that there is a generous clearance between the rollers and the inside wall of tube 38, thus minimizing friction.

Spacers 42 are preferably manufactured from a reinforced polymeric material such as glass-filled nylon. Spacers 42 have concave ends 58, which can be either conical or spherical (as shown), so that the spacers will be supported by the rollers out of contact with tube 38 when the cable is under compression, thereby further minimizing friction. The length of spacers 42 is such that they will not contact with the inside wall of tube 38 when the latter is bent to its minimum radius, thus even further minimizing friction.

Compressive force is exerted on cable 39 by pressing on pedal 20. Pedal 20 pushes against push rod head 48, which in turn causes push rod 46 to contact the end roller 40 of cable 39. Spacers 42 and rollers 40 push against one another, as best seen in FIG. 1 and 5, and compressive force is transmitted through the cable to activate lever 18. Only the smooth low-friction rollers 40 engage the inner surface of tube 38, in order to minimize friction.

When the compressive force is removed from cable 39, spring 30 immediately biases pedal 20 to its original idle or non-depressed position and spring 56 returns the throttle and the elements of cable 39 to their original positions. Rollers 40 and spacers 42 move separately like "loose marbles" transmitting zero force and introducing almost zero friction as everything returns to its original position (see FIG. 4).

Using higher friction cable elements can actually provide additional benefits. For example, if it is assumed that the ideal pedal resistance force is 8–10 pounds in acceleration, that force will be the combination of the throttle return spring force and the friction in the cable. At a fixed throttle position, however, the friction force will be zero and the only pedal resistance will be that created by the return spring. Thus, if more friction is introduced into the cable in the throttle opening direction by using higher friction elements, then less return spring force is necessary, thus further reducing the tendency of cyclic driving.

In FIG. 7, another embodiment of the present invention is shown. Sometimes a cable is needed where the cable can be stopped and held in a desired position intermediate the extremes of its stroke without being manually held, such as in a manual choke or hand operated throttle. In these types of conditions, a mechanism such as that shown in FIG. 7 may be utilized.

The hand control includes a housing 100 having slidably disposed therein a plunger 102 having one end engaging one end of the cable, an intermediate shoulder 104 to limit outward movement of the plunger, and at the outer end a handle 106. Housing 100 has a mechanism for holding the plunger at any position along its stroke comprising a metal portion 107 having a cavity 108 having conical walls 110, several balls 112, a washer 114 and a compression coil spring 116. The spring is disposed in cavity 108 around plunger 102 to gently bias washer 114 against balls 112 to urge them between plunger 105 and conical wall 110. The balls thus resist movement of plunger 102 to the right as shown, thereby causing it to stay wherever it is manually positioned against the force of the usual throttle return spring (not shown).

While the above describes the preferred embodiments of the invention, it will be appreciated that the invention is susceptible to modifications, variations, and alterations without departing from the proper scope and the fair meaning of the subjoined claims.

I claim:

1. An engine throttle control comprising:
   (a) a throttle valve;
   (b) a return spring for normally maintaining said throttle valve in an engine-idle position;
   (c) an accelerator pedal;
   (d) support means mounting said accelerator pedal for movement from an engine-idle position to an engine-full-throttle position, said support means normally maintaining said accelerator pedal in said engine-idle condition; and
   (e) cable means operatively interconnected between said throttle valve and said accelerator pedal, said cable means being movable in an advancing direction from and engine-idle position in response to movement of said accelerator pedal from its engine-idle position to transmit engine accelerating forces applied to said accelerator pedal to said throttle valve to open same, said support means returning said accelerator pedal to its engine-idle position independently of said cable means and said return spring.

2. An engine throttle control as claimed in claim 1, wherein said return spring biases said cable means back to its engine-idle position.

3. An engine throttle control as claimed in claim 1, wherein said cable means comprises a tube containing a plurality of loose, disconnected elements which push against one another to transmit said forces.

4. An engine throttle control as claimed in claim 3, wherein said elements comprise a plurality of rollers and spacers.

5. An engine throttle control as claimed in claim 4, wherein said rollers are spherical balls.

6. An engine throttle control as claimed in claim 4, wherein said rollers are formed of a low friction polymeric material.

7. An engine throttle control as claimed in claim 4, wherein said rollers are formed of a relatively high friction material.

8. An engine throttle control as claimed in claim 4, wherein there is sufficient clearance between said rollers and the inside wall of said tube that they will freely roll therein when said cable means is in an unstressed condition.

9. An engine throttle control as claimed in claim 4, wherein said spacers are formed of a reinforced polymeric material.

10. An engine throttle control as claimed in claim 4, wherein said spacers are cylindrical in configuration.

11. An engine throttle control as claimed in claim 10, wherein each end of each spacer has a concave surface, whereby said spacers will be supported out of contact with the inside wall of said tube by said rollers when said cable means is stressed in compression.

12. An engine throttle control as claimed in claim 11, wherein said concave surface is spherical.

13. An engine throttle control as claimed in claim 12, wherein said rollers are spherical balls having a radius approximately equal to that of each of said concave surfaces.

14. An engine throttle control as claimed in claim 11, wherein said tube is flexible and said spacers are of a length such that they will not engage the inside walls of said tube when the latter is bent to its minimum design radius.

15. An engine throttle control as claimed in claim 10, wherein said rollers are spherical balls and said spacers are of a diameter substantially less than the diameter of said balls.

16. An engine throttle control as claimed in claim 1, wherein the force transmitting portion of said cable means floats when said accelerator pedal is in its engine-idle position.

17. An engine throttle control as claimed in claim 1, wherein there is sufficient friction in said cable means when moved in said advancing direction to reduce the force required by said return spring to obtain a given resistance to movement of said accelerator pedal in said advancing direction, and wherein the return movement of said cable means is substantially unimpeded by friction.

18. A system for controlling the speed and/or torque of an engine, comprising:
(a) a control;
(b) a return spring for normally maintaining said control in an engine-idle position;
(c) a manually actuatable device;
(d) support means mounting said device for movement from an engine-idle position to an engine-full-position, said support means normally maintaining said device in said engine-idle condition; and
(e) cable means operatively interconnected between said control and said device,
said cable means being movable in an advancing direction from an engine-idle position in response to movement of said device from its engine-idle position to transmit engine accelerating forces manually applied to said device to said control to increase engine speed and/or torque,
said support means returning said device to its engine-idle position independently of said cable means and said return spring.

19. An system as claimed in claim 18, wherein said return spring biases said cable means back to its engine-idle position.

20. A system as claimed in claim 18, wherein said cable means comprises a tube containing a plurality of loose, disconnected elements which push against one another to transmit said forces.

21. A system as claimed in claim 20, wherein said elements comprise a plurality of rollers and spacers.

22. A system as claimed in claim 21, wherein said rollers are spherical balls.

23. A system as claimed in claim 21, wherein there is sufficient clearance between said rollers and the inside wall of said tube that they will freely roll therein when said cable means is in an unstressed condition.

24. A system as claimed in claim 21, wherein spacers are cylindrical in configuration.

25. A system as claimed in claim 24, wherein each end of each spacer has a concave surface, whereby said spacers will be supported out of contact with the inside wall of said tube by said rollers when said cable means is stressed in compression.

26. A system as claimed in claim 25, wherein said tube is flexible and said spacers are of a length such that they will not engage the inside walls of said tube when the latter is bent to its minimum design radius.

27. A system as claimed in claim 18, wherein said locking means operates by frictionally resisting movement of said device.

28. A system as claimed in claim 27, wherein said device includes a plunger rod and said locking means includes a conical stationary wall surrounding said rod and a plurality of balls biased in a wedging direction into frictional engagement with said wall and rod.

29. A system as claimed in claim 18, wherein there is sufficient friction in said cable means when moved in said advancing direction to reduce the force required by said return spring to obtain a given resistance to movement of said device in said advancing direction, and wherein the return movement of said cable is substantially unimpeded by friction.

30. An engine throttle control comprising:
(a) a throttle valve normally biased to a substantially closed position;
(b) a manually actuatable device normally biased to a non-actuated position; and
(c) force transmitting means operatively interconnected between said valve and said device,
said force transmitting means normally being in an unstressed condition, and being in a stressed condition only when transmitting forces exerted on said device to said valve,
said force transmitting means being substantially unstressed when said device is in its non-actuated position, regardless of the position of said valve.

31. An engine throttle control comprising:
(a) a throttle valve;
(b) a return spring for normally maintaining said throttle valve in an engine-idle position;
(c) an accelerator pedal;
(d) support means mounting said accelerator pedal for movement from an engine-idle position to an engine-full-throttle position, said support means normally maintaining said accelerator pedal in said engine-idle condition; and
(e) cable means operatively interconnected between said throttle valve and said accelerator pedal,
said cable means being movable in an advancing direction from an engine-idle position in response to movement of said accelerator pedal from its engine-idle position to transmit engine accelerating forces applied to said accelerator pedal to said throttle valve to open same,
said support means returning said accelerator pedal to its engine-idle position independently of said cable means and said return spring, said return spring biasing said cable means back to its engine-idle position, and
said support means returning said accelerator pedal to its engine-idle position faster than said return spring returns said cable means to its engine-idle position pedal.

32. An engine throttle control comprising:
(a) a throttle valve;
(b) a return spring for normally maintaining said throttle valve in an engine-idle position;
(c) an accelerator pedal;
(d) support means mounting said accelerator pedal for movement from an engine-idle position to an engine-full-throttle position, said support means normally maintaining said accelerator pedal in said engine-idle condition; and
(e) cable means operatively interconnected between said throttle valve and said accelerator pedal, said cable means comprising a tube containing a plurality of separate, unconnected elements which push against one another to transmit said forces,
said cable means being movable in an advancing direction from an engine-idle position in response to movement of said accelerator pedal from its engine-idle position to transmit engine accelerating forces applied to said accelerator pedal to said throttle valve to open same.

33. An engine throttle control comprising:
(a) a throttle valve;
(b) a return spring for normally maintaining said throttle valve in an engine-idle position;
(c) an accelerator pedal;
(d) support means mounting said accelerator pedal for movement from an engine-idle position to an engine-full-throttle position, said support means normally maintaining said accelerator pedal in said engine-idle condition; and
(e) cable means operatively interconnected between said throttle valve and said accelerator pedal,
said cable means being movable in an advancing direction from an engine-idle position in response to movement of said accelerator pedal from its engine-idle position to transmit engine accelerating forces applied to said accelerator pedal to said throttle valve to open same, the force transmitting portion of said cable means floating when said accelerator pedal is in its engine-idle position.

34. An engine throttle control comprising:
(a) a throttle valve;
(b) a return spring for normally maintaining said throttle valve in an engine-idle position;
(c) an accelerator pedal;
(d) support means mounting said accelerator pedal for movement from an engine-idle position to an engine-full-throttle position, said support means normally maintaining said accelerator pedal in said engine-idle condition; and
(e) cable means operatively interconnected between said throttle valve and said accelerator pedal,
said cable means being movable in an advancing direction from an engine-idle position in response to movement of said accelerator pedal from its engine-idle position to transmit engine accelerating forces applied to said accelerator pedal to said throttle valve to open same, there being sufficient friction in said cable means when moved in said advancing direction to reduce the force required by said return spring to provide a given resistance to movement of said accelerator pedal in said advancing direction, return movement of said cable means being substantially unimpeded by friction.

35. An engine throttle control comprising:
(a) a throttle valve;
(b) a return spring for normally maintaining said throttle valve in an engine-idle position;
(c) an accelerator pedal;
(d) support means mounting said accelerator pedal for movement from an engine-idle position to an engine-full-throttle position, said support means normally maintaining said accelerator pedal in said engine-idle condition; and
(e) cable means operatively interconnected between said throttle valve and said accelerator pedal,
said cable means being movable in an advancing direction from an engine-idle position in response to movement of said accelerator pedal from its engine-idle position to transmit engine accelerating forces applied to said accelerator pedal to said throttle valve to open same, movement of said cable means in a throttle closing direction being substantially friction free,
said support means returning said accelerator pedal to its engine-idle position independently of said cable means and said return spring.

36. An engine throttle control comprising:
(a) a throttle valve;
(b) a return spring for normally maintaining said throttle valve in an engine-idle position;
(c) an accelerator pedal;
(d) support means mounting said accelerator pedal for movement from an engine-idle position to an engine-full-throttle position, said support means normally maintaining said accelerator pedal in said engine-idle condition; and
(e) cable means operatively interconnected between said throttle valve and said accelerator pedal,
said cable means being movable in an advancing direction from an engine-idle position in response to movement of said accelerator pedal from its engine-idle position to transmit engine accelerating forces applied to said accelerator pedal to said throttle valve to open same, said support means returning said accelerator pedal to its engine-idle position independently of said cable means and said return spring, said return spring exerting a biasing force approximately 10% greater than that normally necessary to return said throttle valve to said engine-idle position.

37. An engine throttle control comprising:
(a) a throttle valve;
(b) a return spring for normally maintaining said throttle valve in an engine-idle position;
(c) an accelerator pedal;
(d) support means mounting said accelerator pedal for movement from an engine-idle position to an engine-full-throttle position, said support means normally maintaining said accelerator pedal in said engine-idle condition and said support means includes a spring to return said accelerator pedal to said engine-idle position; and
(e) cable means operatively interconnected between said throttle valve and said accelerator pedal,
said cable means being movable in an advancing direction from an engine-idle position in response to movement of said accelerator pedal from its engine-idle position to transmit engine accelerating forces applied to said accelerator pedal to said throttle valve to open same,
said support means returning said accelerator pedal to its engine-idle position independently of said cable means and said return spring.

38. A system for controlling the speed and/or torque of an engine, comprising:
(a) a control;
(b) a return spring for normally maintaining said control in an engine-idle position;
(c) a manually actuatable device;
(d) support means mounting said device for movement from an engine-idle position to an engine-full-speed position, said support means normally maintaining said device in said engine-idle condition; and
(e) cable means operatively interconnected between said control and said device,
said cable means being movable in an advancing direction from an engine-idle position in response to movement of said device from its engine-idle position to transmit engine accelerating forces manually applied to said device to said control to increase engine speed and/or torque,
said cable means comprising a tube containing a plurality of separate, unconnected elements which push against one another to transmit said forces,
said support means returning said device to its engine-idle position independently of said cable means and said return spring.

39. A system for controlling the speed and/or torque of an engine, comprising:
(a) a control;
(b) a return spring for normally maintaining said control in an engine-idle position;
(c) a manually actuatable device;
(d) support means mounting said device for movement from an engine-idle position to an engine-full-speed position, said support means normally maintaining said device in said engine-idle condition;
(e) cable means operatively interconnected between said control and said device,
said cable means being movable in an advancing direction from an engine-idle position in response to movement of said device from its engine-idle position to transmit engine accelerating forces manually applied to said device to said control to increase engine speed and/or torque,
said support means returning said device to its engine-idle position independently of said cable means and said return spring; and
(f) locking means for holding said device in any selected intermediate position against the force of said return spring and in the absence of any manual actuation of said device.

40. A system for controlling the speed and/or torque of an engine, comprising:
(a) a control;
(b) a return spring for normally maintaining said control in an engine-idle position;
(c) a manually actuatable device;
(d) support means mounting said device for movement from an engine-idle position to an engine-full-speed position, said support means normally maintaining said device in said engine-idle condition; and
(e) cable means operatively interconnected between said control and said device,
said cable means being movable in an advancing direction from an engine-idle position in response to movement of said device from its engine-idle position to transmit engine accelerating forces manually applied to said device to said control to increase engine speed and/or torque, there being sufficient friction in said cable means when moved in said advancing direction to reduce the force required by said return spring to provide a given resistance to movement of said device in said advancing direction, return movement of said cable being substantially unimpeded by friction.

41. A system for controlling the speed and/or torque of an engine, comprising:
(a) a control;
(b) a return spring for normally maintaining said control in an engine-idle position;
(c) a manually actuatable device;
(d) support means mounting said device for movement from an engine-idle position to an engine-full-speed position, said support means normally maintaining said device in said engine-idle condition; and
(e) cable means operatively interconnected between said control and said device,
said cable means being movable in an advancing direction from an engine-idle position in response to movement of said device from its engine-idle position to transmit engine accelerating forces manually applied to said device to said control to increase engine speed and/or torque, movement of said cable means in both directions being substantially friction free,
said support means returning said device to its engine-idle position independently of said cable means and said return spring.

42. A system for controlling the speed and/or torque of an engine, comprising:
(a) a control;
(b) a return spring for normally maintaining said control in an engine-idle position;

(c) a manually actuatable device;
(d) support means mounting said device for movement from an engine-idle position to an engine-full-speed position, said support means normally maintaining said device in said engine-idle condition; and
(e) cable means operatively interconnected between said control and said device,
    said cable means being movable in an advancing direction from an engine-idle position in response to movement of said device from its engine-idle position to transmit engine accelerating forces manually applied to said device to said control to increase engine speed and/or torque,
said support means returning said device to its engine-idle position independently of said cable means and said return spring, said return spring exerting a biasing force approximately 10% greater than that normally necessary to return said control to said engine-idle position.

* * * * *